United States Patent
Choi et al.

(10) Patent No.: US 11,619,496 B2
(45) Date of Patent: Apr. 4, 2023

(54) SYSTEM AND METHOD OF DETECTING CHANGE IN OBJECT FOR UPDATING HIGH-DEFINITION MAP

(71) Applicants: KOREA EXPRESSWAY CORP., Gimcheon-si (KR); U1GIS, Uiwang-si (KR)

(72) Inventors: In Gu Choi, Seongnam-si (KR); Jae Hyung Park, Suwon-si (KR); Gi Chang Kim, Anyang-si (KR); Duk Jung Kim, Yongin-si (KR)

( * ) Notice: Subject to any disclaimer, the term of this patent is extended or adjusted under 35 U.S.C. 154(b) by 456 days.

(21) Appl. No.: 16/729,450

(22) Filed: Dec. 29, 2019

(65) Prior Publication Data

US 2021/0190512 A1 Jun. 24, 2021

(30) Foreign Application Priority Data

Dec. 24, 2019 (KR) ........................ 10-2019-0174458

(51) Int. Cl.
*G01C 21/00* (2006.01)
*G01C 21/32* (2006.01)
(Continued)

(52) U.S. Cl.
CPC .............. *G01C 21/32* (2013.01); *B60R 11/04* (2013.01); *G06T 7/74* (2017.01); *G06T 17/05* (2013.01);
(Continued)

(58) Field of Classification Search
CPC ........... B01C 21/32; G06T 7/74; G06T 17/05; G06T 2207/30244; G06V 20/56; B60R 11/04
See application file for complete search history.

(56) References Cited

U.S. PATENT DOCUMENTS

2020/0318975 A1* 10/2020 Yoshida ................. G06T 11/60

FOREIGN PATENT DOCUMENTS

CA            3027787         12/2019
DE    112019005949 T5 *  8/2021    ......... G06K 9/00791
(Continued)

OTHER PUBLICATIONS

English Specification of 10-2052114.
(Continued)

*Primary Examiner* — Adam M Alharbi
(74) *Attorney, Agent, or Firm* — Antonio Ha & U.S. Patent, LLC (57) ABSTRACT

According to an embodiment, a system includes at least one change detecting device that includes a map information storage unit receiving a high-definition map including a property of each road facility object and spatial coordinates of a feature point from a map updating server and storing the received high-definition map, an object coordinates obtaining unit recognizing at least one road facility object from the road image and obtaining a property of the recognized object and spatial coordinates of a feature point. and a changed object detecting unit comparing the property of the recognized object and the spatial coordinates of the feature point with the high-definition map and, if a change object is detected, transmitting object change information including a property and feature point spatial coordinates of the change object to the map updating server.

12 Claims, 5 Drawing Sheets

(51) Int. Cl.
  *G06T 7/73* (2017.01)
  *B60R 11/04* (2006.01)
  *G06T 17/05* (2011.01)
  *G06V 20/56* (2022.01)
(52) U.S. Cl.
  CPC .... *G06V 20/56* (2022.01); *G06T 2207/30244* (2013.01)

(56) References Cited

FOREIGN PATENT DOCUMENTS

| | | |
|---|---|---|
| JP | 2006-250917 A | 9/2006 |
| JP | 2016-156973 A | 9/2016 |
| JP | 2018-163438 A | 10/2018 |
| JP | 2019-003606 A | 5/2019 |
| JP | 2019-114086 A | 7/2019 |
| KR | 10-2014-0072763 | 6/2014 |
| KR | 10-2015-0144728 | 12/2015 |
| KR | 10-2019-0003884 | 1/2019 |
| KR | 10-2052114 | 12/2019 |
| WO | 2018-126215 | 7/2018 |

OTHER PUBLICATIONS

English Specification of JP2006-250917A.
English Specification of JP2016-156973A.
English Specification of 2018-163438.
English Specification of JP2019-003606A.
English Specification of JP2019-114086A.
English Specification of 10-2015-0144728.
English Specification of 10-2019-0003884.
English Specification of 10-2014-0072763.

* cited by examiner

SYSTEM AND METHOD OF DETECTING CHANGE IN OBJECT FOR UPDATING HIGH-DEFINITION MAP

CROSS-REFERENCE TO RELATED APPLICATION(S)

This application is based on and claims priority under 35 U.S.C. 119 to Korean Patent Application No. 10-2019-0174458, filed on Dec. 24, 2019, in the Korean Intellectual Property Office, the disclosure of which is herein incorporated by reference in its entirety.

TECHNICAL FIELD

Various embodiments of the disclosure relate to systems and methods of detecting a change in object to update a high-definition map, and more specifically, to systems and methods of detecting a change in object to update a high-definition map, which may reduce costs and communication loads of devices for detecting changes in an object based on a camera during an electronic map updating process in which a probe vehicle recognizes a change in object so as to maintain the quality of the high-definition map.

DESCRIPTION OF RELATED ART

An autonomous vehicle may recognize its position and ambient environment and create a route along which the vehicle may drive safely and efficiently based on the recognized information. The autonomous vehicle may control its steering and speed along the created route.

The autonomous vehicle may recognize its ambient environment (e.g., road facilities, such as lanes or traffic lights or landmarks) using its sensors (e.g., cameras, laser scanners, radar, global navigation satellite system (GNSS), or inertial measurement unit (IMU)) and create a route based on the recognized ambient environment. This way, however, may not work if the ambient environment is difficult to recognize, such as when there are no road lanes or the road environment is very complicated.

A high-definition map provides both 3D high-definition location information and detailed road information, e.g., precise lane information and other various pieces of information necessary for driving, such as the position of traffic lights, the position of stop lines, and whether lanes are changeable lanes or whether intersections are ones permitting a left turn. The autonomous vehicle may drive more safely with the aid of the high-definition map. The high-definition map used for controlling the autonomous vehicle is a three-dimensional (3D) stereoscopic map up to an accuracy of 30 cm for autonomous driving. Whereas the accuracy of ordinary $1/1,000$ maps (digital maps) is 70 cm, the high-definition map is as accurate as 25 cm or less. This is ten times as accurate as navigation maps whose accuracy is 1 m to 2.5 m.

The high-definition map is also utilized for gathering event information on the road based on precise location information via a dashboard camera that is equipped with various safety functionalities, such as forward collision warning or lane departure warning. The high-definition map may also be used for information exchange for camera-equipped connected cars and precise positioning by gathering event information and information for various road facilities using various camera-equipped vehicles.

To build up a high-definition map, the mobile mapping system is used. The MMS is a mobile 3D spatial information system incorporating a digital camera, a 3D laser scanner system (LiDAR), GNSS, and IMU. The MMS is equipped in a moving body, e.g., a vehicle. An MMS-equipped vehicle may perform 360-degree, omni-directional capturing or recording while driving 40 km to 100 km per hour. The MMS is a very expensive piece of equipment. Creation and update of a high-definition map using the MMS consumes lots of labor and costs. The MMS cannot quickly update the high-definition map when changes are made to the road condition and may rather harm the safety of autonomous vehicles that rely on the high-definition map for autonomous driving.

Thus, a need exists for a new technology that may detect a change in object information included in a high-definition map, with default information for the high-definition map established, and apply the detected change to fit the purpose of updating and may reduce device costs and communication loads.

SUMMARY

Conventional mobile managing systems (MMSs) operate in such a manner as to store massive data, which are obtained through expensive sensors, e.g., LiDAR or high-definition cameras for autonomous driving, in local storage (in a vehicle) or transmit the data to a server. The conventional art detects changes or variations in objects adjacent a road which are frequently made and, for the purpose of updating a high-definition electronic map previously created, may be disadvantageous in light of excessive costs and network loads. An object of the disclosure is to provide a system and method of detecting a change in an object for updating a high-definition map, which may detect changes frequently made to road-related adjacent objects in a prepared high-definition map via images captured by a camera and transmit results detected in relation to the changes to the objects, rather than the entire sensing information, to a server, thereby leading to cost savings and reducing network loads.

According to an embodiment, there is provided a system for detecting a change in object for updating a high-definition map. The system includes at least one or more change detecting devices comparing the high-definition map and a road facility object of a road image captured by a camera fixed to a vehicle. Each of the change detecting devices includes a map information storage unit receiving a high-definition map including a property of each road facility object and spatial coordinates of a feature point from a map updating server and storing the received high-definition map, an object coordinates obtaining unit recognizing at least one road facility object from the road image and obtaining a property of the recognized object and spatial coordinates of a feature point. and a changed object detecting unit comparing the property of the recognized object and the spatial coordinates of the feature point with the high-definition map and, if a change object is detected, transmitting object change information including a property and feature point spatial coordinates of the change object and an image of the change object to the map updating server. The change object is any one of an object property change, generation of a new object, and deletion of an existing object.

The object coordinates obtaining unit may include an object recognizing unit recognizing, per frame of the road image, a road facility object including at least one of a ground control point (GCP) object and an ordinary object and a property, a feature point extracting unit extracting a feature point of at least one or more road facility objects from the road image, a feature point tracking unit matching and tracking the feature point in consecutive frames of the road image, a coordinate determining unit obtaining relative spatial coordinates of the feature point to minimize a difference between camera pose information predicted from the tracked feature point and calculated camera pose information, and a correcting unit obtaining absolute spatial coordinates of the feature point by correcting the relative spatial coordinates of the feature point based on a coordinate point of the GCP object whose absolute spatial coordinates are known when the GCP object is recognized.

The map updating server may include a candidate group creating unit gathering the object change information from the at least one or more change detecting devices, generating information for a group of candidates that are change objects of the object change information, and distributing the candidate group information to the change detecting devices. Upon approaching one of one of the candidates included in the candidate group information, the change detecting device may capture a candidate image for the candidate and transmits the captured candidate image to the map updating server.

The map updating server may include a candidate identifying unit identifying whether the candidate of the candidate image is a true change object only when not hidden by an obstacle and, if the candidate is identified to be the true change object, updating the high-definition map on the true change object. The updated high-definition map may be distributed to the at least one or more change detecting devices.

The candidate group information may include an deactivation list that delays transmitting a specific candidate image. If the same candidate is hidden by an obstacle not to be recognized from a candidate image gathered for the same candidate from at least two or more change detecting devices, the map updating server may include the same candidate in the deactivation list for a preset time.

The change detecting device may compare the property and feature point spatial coordinates of the object recognized per frame of the road image with an object of the high-definition map and, upon determining that the objects match each other in at least one or more frames, determine that there is no object change.

According to an embodiment, there is provided a method of detecting a change in an object for updating a high-definition map. The method is performed by at least one or more change detecting devices. The method includes receiving a high-definition map including a property of each road facility object and spatial coordinates of a feature point from a map updating server and storing the received high-definition map, recognizing at least one road facility object from a road image including an image of a road facility object captured by a camera fixed to a vehicle and obtaining a property and feature point spatial coordinates of the recognized object, and comparing the property of the recognized object and the spatial coordinates of the feature point with the high-definition map and, if a change object is detected, transmitting object change information including a property and feature point spatial coordinates of the change object and an image of the change object to the map updating server. The change object is any one of an object property change, generation of a new object, and deletion of an existing object.

According to an embodiment, the method may further include recognizing, per frame of the road image, a road facility object including at least one of a ground control point (GCP) object and an ordinary object and a property, extracting a feature point of at least one or more road facility objects from the road image, matching and tracking the feature point in consecutive frames of the road image, obtaining relative spatial coordinates of the feature point to minimize a difference between camera pose information predicted from the tracked feature point and calculated camera pose information, and obtaining absolute spatial coordinates of the feature point by correcting the relative spatial coordinates of the feature point based on a coordinate point of the GCP object whose absolute spatial coordinates are known when the GCP object is recognized.

The method may further include gathering, by the map updating server, the object change information from the at least one or more change detecting devices, generating information for a group of candidates that are change objects of the object change information, and distributing the candidate group information to the change detecting devices and, upon approaching one of one of the candidates included in the candidate group information, capturing, by the change detecting device, a candidate image for the candidate and transmitting the captured candidate image to the map updating server.

The method may further include identifying, by the map updating server, whether the candidate of the candidate image is a true change object only when not hidden by an obstacle and, if the candidate is identified to be the true change object, updating, by the map updating server, the high-definition map on the true change object. The updated high-definition map may be distributed to the at least one or more change detecting devices.

The candidate group information may include an deactivation list that delays transmitting a specific candidate image. If the same candidate is hidden by an obstacle not to be recognized from a candidate image gathered for the same candidate from at least two or more change detecting devices, the map updating server may include the same candidate in the deactivation list for a preset time.

The method may further include comparing the property and feature point spatial coordinates of the object recognized per frame of the road image with an object of the high-definition map and, upon determining that the objects match each other in at least one or more frames, determining that there is no object change.

Various embodiments of the disclosure may detect changes frequently made to objects adjacent to a road in a prepared high-definition electronic map but transmit results detected in relation to the changes to the objects, rather than the entire sensing information, to a server, thereby leading to cost savings and reducing network loads and hence prompting commercialization and spread of autonomous driving.

Various embodiments of the disclosure may identify objects with high-definition spatial coordinates properties present in a high-definition electronic map, calculate the spatial position of a target object based on the identified objects, and identify changes in the object using accrued measurement information to thereby manage new objects and changes in existing objects using relatively low-accuracy sensors but with higher reliability.

BRIEF DESCRIPTION OF THE DRAWINGS

A more complete appreciation of the disclosure and many of the attendant aspects thereof will be readily obtained as the same becomes better understood by reference to the following detailed description when considered in connection with the accompanying drawings, wherein.

DETAILED DESCRIPTION OF EXEMPLARY EMBODIMENTS

Some terms as used herein may be defined as follows.

'Road facility object' refers to a facility included in a precise map and includes at least one of pavement markings, warning signs, regulatory signs, mandatory signs, additional signs, traffic signs, traffic lights, street lamps, poles, manholes, curbs, median barriers, fire hydrants, and/or buildings. Road facility objects may be fixed and displayed on the road or may be facilities in the air, such as traffic lights, some feature points of buildings, or signs, or may be displayed on such facilities.

'Road facility object' may refer to any kind of facility that may be included in a precise map and its concept may encompass pavement markings, warning signs, regulatory signs, mandatory signs, additional signs, traffic signs, traffic lights, street lamps, poles, manholes, curbs, median barriers, fire hydrants, buildings, and/or building signs. In the disclosure, at least one or more of such objects may be used. For example, road center lines, solid lines, broken lines, turn-left arrows, drive straight ahead arrows, slow-down diamond-shaped markings, speed limit zone markings, or any other various kinds of pavement markings which may be painted on the road, street lamps, poles, manholes, fire hydrants, curbs, median barriers, sign boards, or any other various road structures which are installed on the road and various signs or markings on the structures, traffic control devices or traffic lights, various kinds of signs or markings on traffic lights, and buildings may belong to facility objects.

'Ground control point (GCP)' refers to a coordinate point used for absolute orientation, whose exact coordinates have been known. In the disclosure, among various road facility objects, manhole covers, fire hydrants, ends or connectors of road facilities, or road drainage structures may be used as GCP objects.

'High-definition road map' refers to a map information database which includes and stores the respective properties (or attributes) of road facility objects and spatial coordinate information for the feature points of road facility objects. The respective feature points of road facility objects included in the high-definition map may correspond to spatial coordinate information for the feature points in a one-to-one correspondence manner. As used herein, "feature point of a road facility object" refers to a featuring point in the road facility. For example, in an image of a road facility object, the inside or outside vertexes whose boundary is noticeable by clear changes in color and brightness or noticeable points in the contour may be feature points. Thus, a feature point of a road facility object may be a vertex or any point in an edge of the road facility object.

The high-definition map is an electronic map created with all road facility object information necessary for autonomous driving and is used for autonomous vehicles, connected cars, traffic control, and road maintenance.

'Change object' may refer to an object to which a change has been made.

Figure 1:
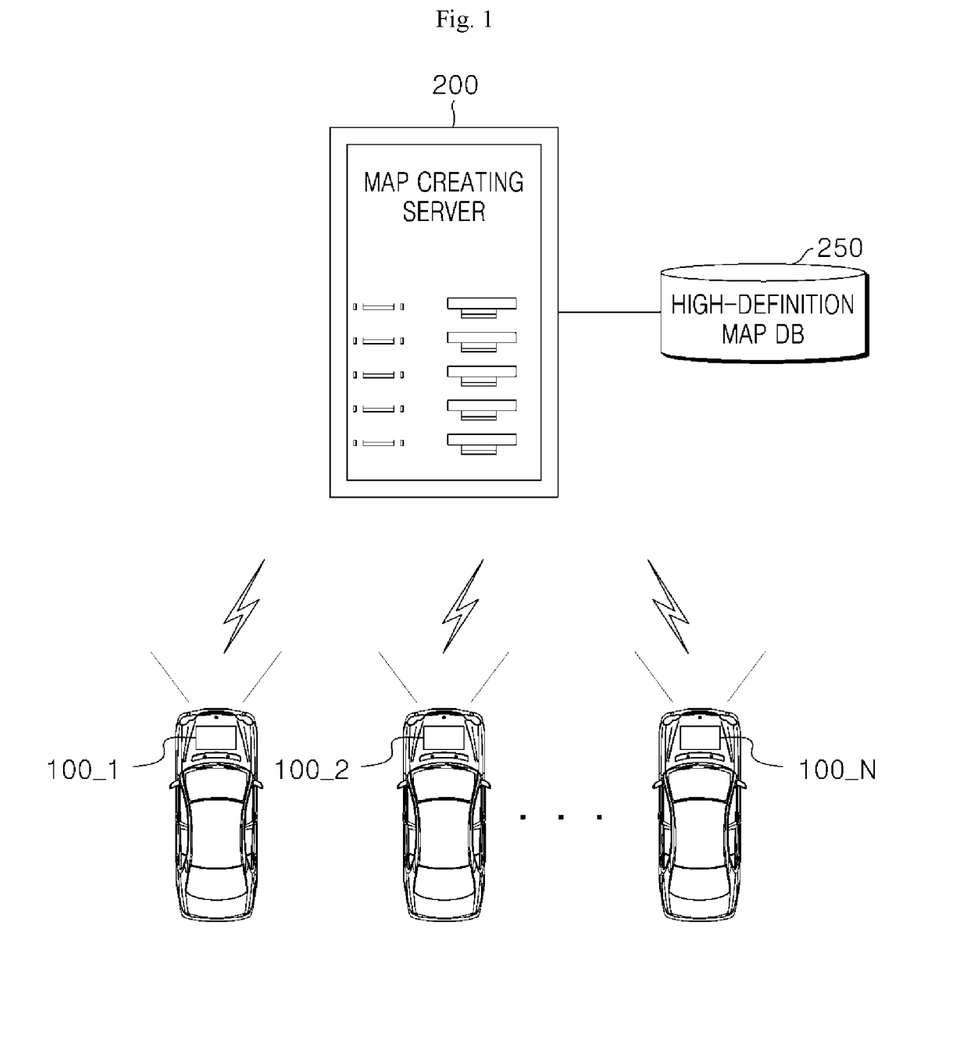
FIG. 1 is a view illustrating an object change detecting system for updating a high-definition map according to an embodiment.

FIG. 1 is a view illustrating an object change detecting system for updating a high-definition map according to an embodiment.

Referring to FIG. 1, an object change detecting system for updating a high-definition map includes at least one or more change detecting devices 100_1 to 100_n and a map updating server 200.

The change detecting device 100_1 to 100_n is equipped in a probe vehicle. The change detecting device 100_1 to 100_n obtains the properties and spatial coordinates of road facility objects positioned on the road or in the air from a captured road image, compares the obtained properties and spatial coordinates of the road facility objects with a high-definition map to thereby detect an object change.

As used herein, "object change" may mean any one of a change in the properties of the road facility object, creation of a new road facility object, and disappearance of an existing road facility object. For example, object changes may include creation of a new lane, a change in kind of the existing lane, or relocating of a traffic light.

The information for the object change detected by the change detecting device 100_1 to 100_n is transmitted to the map updating server 200. The map updating server 200 compiles (merges or combines) and analyzes the object change information received from each change detecting device 100_1 to 100_n, thereby determining whether there is a change in a road facility object included in the high-definition map. Upon determining that there is a change in the road facility object, the map updating server 200 updates the high-definition map and distributes the updated high-definition map to all of the change detecting devices 100_1 to 100_n.

Each of the plurality of probe vehicles are equipped with a change detecting device 100_1 to 100_n. The process in which the change detecting device 100_1 to 100_n compares the properties and feature point spatial coordinates of each road facility object continuously recognized from the receptions captured while the probe vehicle drives with each object in the high-definition map is repeated. Thus, a change in the road facility object included in the high-definition map may be effectively detected and the high-definition map may be effectively updated. Further, the high-definition map, although it is one for a wide area, may be quickly updated using the plurality of change detecting devices.

Figure 2:
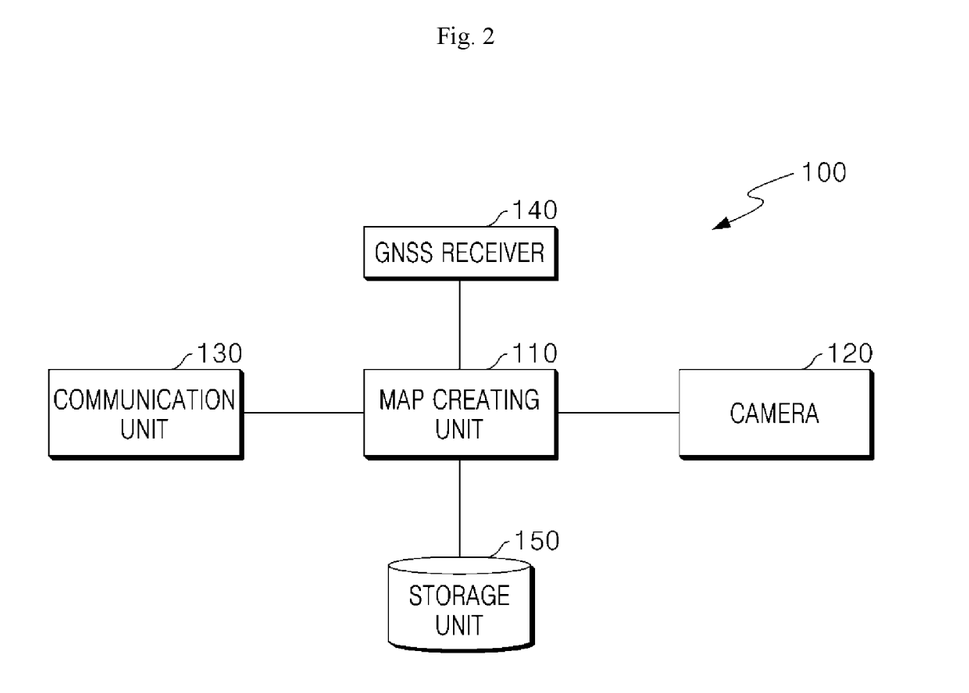
FIG. 2 is a block diagram illustrating a configuration of a change detecting device according to an embodiment.

FIG. 2 is a block diagram illustrating a configuration of a change detecting device according to an embodiment.

Referring to FIG. 2, according to an embodiment, a change detecting device 100 includes a change detecting unit 110. The change detecting device 100 may further include at least one of a camera 120, a communication unit 130, a GNSS receiver 140, and a storage unit 150. Although not shown in FIG. 2, the change detecting device 100 may further include an inertial measurement unit (IMU).

The change detecting unit 110 may recognize road facility objects and their properties from a road image captured by a camera fixed to a probe vehicle and compare the recognized information with each object in the high-definition map, thereby detecting an object change in the road facility objects.

The camera 120 is fixed to a probe vehicle. The camera 120 captures in the forward direction of the vehicle to create a road image including road facility object images. The created road image is transferred to the change detecting unit 110.

The communication unit 130 communicates with the map updating server 200. The communication unit 130 receives the high-definition map from the map updating server 200 and, if there is a change in the road facility object, transmits object change information including the properties and feature point spatial coordinates of the change object and an image of the change object to the map updating server 200. As described below, candidate group information for change object candidates is also received from the map updating server 200.

The GNSS receiver 140 periodically obtains GNSS location information. In particular, the GNSS receiver 140 may obtain the GNSS location information for the capturing location of the camera 120 at the time synchronized with the capturing time of the camera 120. The global navigation satellite system (GNSS) is a positioning or locating system using satellites and may use the global positioning system (GPS).

The storage unit 150 may store the high-definition map, the road image captured by the camera 120, and the object change information for the change object.

Figure 3:
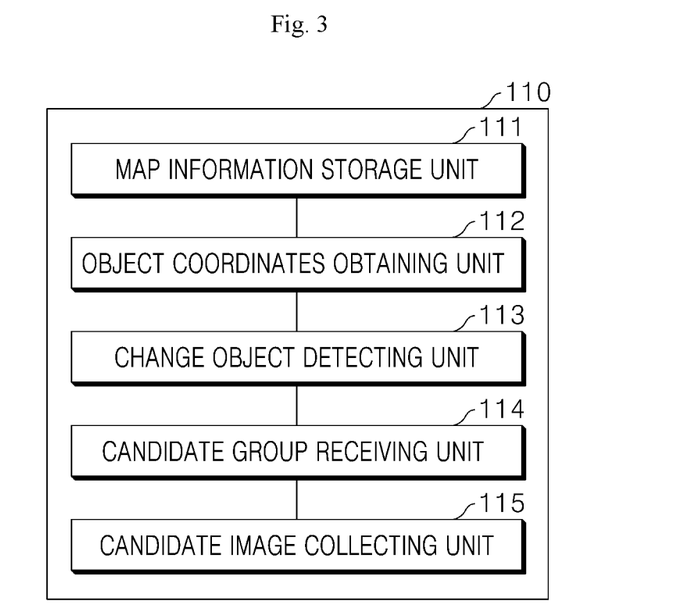
FIG. 3 is a block diagram illustrating a configuration of a change detecting unit in a change detecting device according to an embodiment.

FIG. 3 is a block diagram illustrating a configuration of a change detecting unit in a change detecting device according to an embodiment.

Referring to FIG. 3, the change detecting unit 110 includes at least one of a map information storage unit 111, an object coordinates obtaining unit 112, a change object detecting unit 113, a candidate group receiving unit 114, and a candidate image collecting unit 115.

The map information storage unit 111 receives a high-definition map including the properties and feature point spatial coordinates of each road facility object from the map updating server 200 and stores the received high-definition map. Whenever a new high-definition map is created or the existing high-definition map is updated due to a change in road facility object, the map updating server 200 distributes the high-definition map to the change detecting device 100_1 to 100_n, and each change detecting device 100_1 to 100_n receives the updated high-definition map and stores the received high-definition map in the map information storage unit 111.

The object coordinates obtaining unit 112 recognizes at least one or more road facility object from the road image and obtains the properties and feature point spatial coordinates of the recognized objects. This is described below in greater detail.

The change object detecting unit 113 compares the properties and feature point spatial coordinates of the recognized objects with the objects of the high-definition map and, if a change object is detected, transmits object change information including the properties and feature point spatial coordinates of the change object and an image of the change object to the map updating server 200.

Since the properties and feature point spatial coordinates of the road facility object recognized by the object coordinates obtaining unit 112 does not exactly match the properties and feature point spatial coordinates of the object in the high-definition map, if a difference between the recognized properties and feature point spatial coordinates of the road facility object and its corresponding properties and feature point spatial coordinates of the object in the high-definition map is a threshold range or less, the change object detecting unit 113 determines that the spatial coordinates of the objects match each other.

As used herein, "object change" may mean any one of a change in the properties of the road facility object, creation of a new road facility object, and disappearance of an existing road facility object.

The change object detecting unit 113 identifies whether there is an object, whether there is a property change, and whether there is a change in the feature point spatial coordinates by performing the comparison of properties and feature point spatial coordinates between all of the recognized road facility objects and their corresponding high-definition map objects.

The change object detecting unit 113 compares the properties and feature point spatial coordinates of the object recognized per frame of the road image with the properties and feature point spatial coordinates of the high-definition map object and, upon determining that there is an object match in at least one or more frames, determine that there is no change in the objects. For various reasons, no road facility object may be recognized from some frames of the road image. Thus, if the properties and feature point spatial coordinates of a road facility object are recognized from at least one or more road image frames, and the recognized object is determined to match a high-definition map object, there is determined to be no change in the object.

The candidate group receiving unit 114 receives information for a group of candidates that are change objects in the object change information from the map updating server 200. As described below, the candidate group information may include an deactivation list for delaying the transmitting of a specific candidate image.

The candidate image collecting unit 115, if approaching one of the candidates included in the candidate group information, captures a candidate image for the candidate and transmits the captured candidate image to the map updating server 200. If the deactivation list is included in the candidate group information, transmitting images for the candidates included in the deactivation list may be delayed for a predetermined time.

Figure 4:
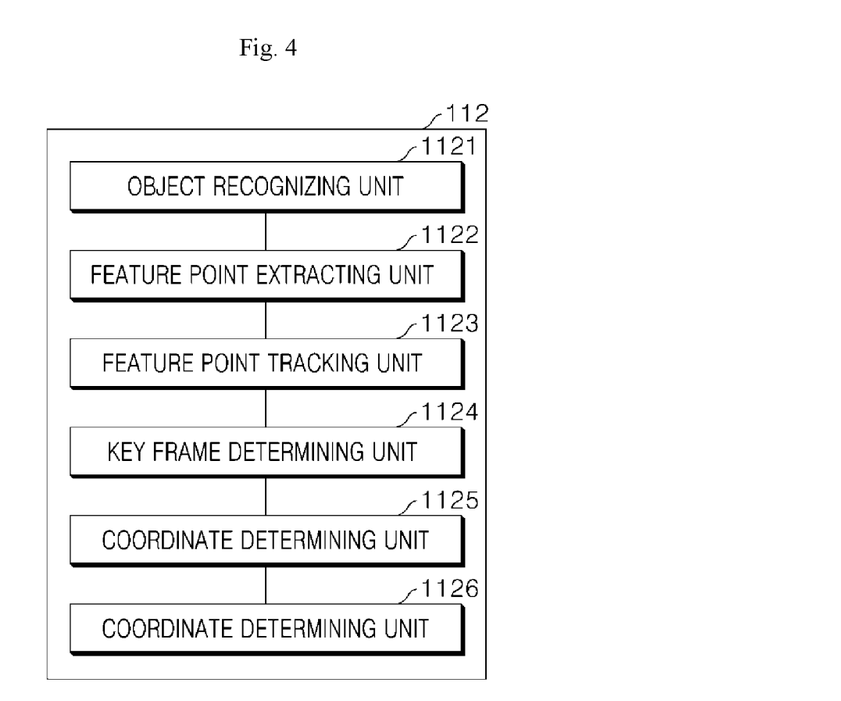
FIG. 4 is a block diagram illustrating an object coordinates obtaining unit as shown in FIG. 3.

FIG. 4 is a block diagram illustrating an object coordinates obtaining unit as shown in FIG. 3.

Referring to FIG. 3, the object coordinates obtaining unit 112 may include at least one of an object recognizing unit 1121, a feature point extracting unit 1122, a feature point tracking unit 1123, a key frame determining unit 1124, a coordinate determining unit 1125, and a correcting unit 1126.

The object recognizing unit 1121 recognizes road facility objects including at least one of GCP objects and ordinary objects from each frame and the properties of the road facility objects. The object recognizing unit 1121 recognizes road facility objects and their properties from the road image via machine learning, including deep learning, or other various image processing schemes.

The object recognizing unit 1121 may correct distortions in the road image which may occur due to the lenses, detect moving objects, e.g., vehicles, motorcycles, or humans, from the road image, and remove or exclude the moving objects, thereby allowing the stationary road facility objects on the ground or in the air to be efficiently recognized.

The feature point extracting unit 1122 extracts the feature points of at least one or more road facility objects from the road image. The feature point extracting unit 1122 extracts myriad feature points of road facility objects recognized by the object recognizing unit 1121. To detect feature points, various algorithms may apply which include, but are not limited to, features from accelerated segment test (FAST), oriented FAST and rotated BRIEF (ORB), scale-invariant feature transform (SIFT), adaptive and generic accelerated segment test (AGAST), speeded-up robust features (SURF), binary robust independent elementary features (BRIEF), Harris corner, and/or Shi-Tomasi corner.

The feature point tracking unit 1123 matches and tracks the feature points of the road facility objects extracted from each frame of the road image on each consecutive frame.

The key frame determining unit 1124 may determine a key frame in each frame of the road image to reduce the amount of computation of the coordinate determining unit 1125 and perform control so that the computation of the pose obtaining unit and the spatial coordinates determining unit is performed only in the determined key frame.

To that end, the key frame determining unit 1124 analyzes the feature points of each frame in the road image and determine that the frame when the relative spatial coordinates of the feature point has moved a reference range or more between the frames is the key frame. Since 'key frame' means a frame where a large change occurs among the image frames of the road image, the frame where the relative spatial coordinates of the feature point has moved the reference range or more may be determined to be the key frame. The case where the relative spatial coordinates of the feature point has moved the reference range or more means that the vehicle moves a predetermined distance or more so that the change in position of the feature point in the road image has shifted the reference range or more. Tracking the feature point of the road image which makes no or little change as when the vehicle stops or moves slowly may be meaningless. Thus, the computation loads may be reduced by determining that the frame after the vehicle has moved a predetermined distance is the key frame and tracking the feature points using only the key frame.

The key frame determining unit 1124 may further reduce the computation loads by determining that the same feature point present in a plurality of key frames is a tie point and deleting the other feature points than the determined tie point.

The coordinate determining unit 1125 obtains relative spatial coordinates of the feature point to minimize a difference between camera pose information predicted from the tracked feature point and calculated camera pose information. At this time, the coordinate determining unit 1125 may determine the relative spatial coordinates or absolute spatial coordinates of the feature point of the road facility object per frame of the road image.

The correcting unit 1126, upon recognizing a GCP object, obtains the absolute spatial coordinates of the feature point by correcting the relative spatial coordinates of the feature point with respect to the coordinate point of the GCP object whose spatial coordinates has been known.

Since the road facility object is a fixed object on the ground or in the air, the road facility object present in the road image may be positioned on the road or in the air.

The coordinate determining unit 1125 may identify whether the road facility object included in the road image is a road object which is positioned on the road or a mid-air object which is positioned in the air based on the properties of the road facility object.

If the position of the road facility object is determined, the coordinate determining unit 1125 may determine the spatial coordinates of the feature point of the road facility object in two methods as follows.

The first method may determine both the spatial coordinates of the road object and the spatial coordinates of the mid-air object. In the first method, the spatial coordinates of each object whose spatial coordinates are not known are determined based on the camera pose information in each frame of the road image.

If each feature point is tracked in the continuous frames or key frame in the road image, the correspondence between the image frames may be traced so that the position of each feature point or the pose information for the camera may be predicted.

In this case, a difference may occur between the position of the feature point or the pose information for the camera, which is predicted from the correspondence between image frames, and the position of each feature point or pose information for the camera, which is computed from each frame of the road image and, in the process of minimizing the difference, the relative spatial coordinates of each feature point in each frame and relative pose information for the camera may be obtained.

The obtained spatial coordinates of the feature point and pose information may be represented as a value relative to a reference position or a reference pose. Thus, if the absolute spatial coordinates of a feature point or exact pose information for the camera is known at a certain time, the obtained relative spatial coordinates of feature point and the relative pose information for the camera may be corrected to a precise value.

Coordinate points whose absolute spatial coordinates have already been known are present in the GCP object, and the properties of the GCP object and information for coordinate points whose absolute spatial coordinates may be known in the GCP object are previously stored in the map creating device.

Thus, if the GCP object is recognized, the coordinate determining unit 1125 detects at least four coordinate points whose spatial coordinates have been known and obtains the camera pose information using a pin hole camera model from the at least four coordinate points detected.

The camera pose information is information for the position and pose of the camera, and the camera pose information includes information for the spatial coordinates, the roll, pitch, and yaw of the camera.

External parameters of the camera may be obtained via the pin hole camera model based on Equation 1.

$$sp_c = K[R|T]p_w \qquad \text{[Equation 1]}$$

In Equation 1, K is the intrinsic parameter of the camera, [R|T] is the extrinsic parameter of the camera, $P_w$ is the 3D spatial coordinates, Pc is the 2D camera coordinates corresponding to the 3D spatial coordinates, and s is the image scale factor. The extrinsic parameter of the camera is a parameter that specifies the transform relationship between the 2D camera coordinating system and the 3D world coordinating system. The extrinsic parameter includes information for the pose and installation position of the camera and is expressed with the rotation matrix R and the translation matrix T between the two coordinating systems.

Equation 1 may be represented as Equation 2.

$$s \begin{bmatrix} u \\ v \\ 1 \end{bmatrix} = \begin{bmatrix} f_x & \gamma & u_0 \\ 0 & f_y & v_0 \\ 0 & 0 & 1 \end{bmatrix} \begin{bmatrix} r_{11} & r_{12} & r_{13} & t_1 \\ r_{21} & r_{22} & r_{23} & t_2 \\ r_{31} & r_{32} & r_{33} & t_3 \end{bmatrix} \begin{bmatrix} x \\ y \\ z \\ 1 \end{bmatrix} \qquad \text{[Equation 2]}$$

Here, (x, y, z) is the 3D spatial coordinates of the world coordinating system, $f_x$ is the focal length in the x axis direction, $f_y$ is the focal length in the y axis direction, (u, v) is the 2D camera coordinates of the camera coordinating system, γ is the skew coefficient which indicates the degree of y-axis tilt of the image sensor cell array, and $(u_0, v_0)$ is the camera coordinates of the principal point of the camera.

Since the absolute spatial coordinates of at least four points in the frame of the road image are known, and the intrinsic parameter of the camera and image scale factor may be known, the camera pose information may be obtained via the above equations.

The correcting unit 1126 may correct the relative spatial coordinates of each feature point in the frame with respect to the camera pose information so obtained, thereby obtaining the absolute spatial coordinates. As described below, the correcting unit 1126 may correct the spatial coordinates of feature points using other schemes.

The second method is to determine the spatial coordinates of the road object positioned on the road. In the second method, the spatial coordinates of each road object whose spatial coordinates is not known in each frame of the road image are determined via a homography transform.

A homography may be used for positioning of the probe vehicle and the spatial coordinates of the road object. If one plane is projected onto another plane, a predetermined transform relationship is formed between the projected corresponding points, and such a transform relationship is called a homography.

Since a homography transform function is a function that defines the relationship between each dimensional image and one absolute coordinating system (absolute spatial coordinates), the homography transform function may transform the image coordinates of the camera into the spatial coordinates of the absolute coordinating system. From the spatial coordinates of the four points whose spatial coordinates have previously been known and the camera coordinates in the points, the spatial coordinates of all of the other points of the road may be computed using the transform relationship.

As described above, the correcting unit 1126 performs final correction on the absolute spatial coordinates of the road facility object via the process of correcting the camera pose information, and the feature points of the road facility objects gathered per frame in the road image.

Correction of the spatial coordinates of the road facility object may be performed using four schemes as follows.

The first scheme is a local bundle adjustment (LBA) scheme that bundles up the per-frame camera pose information and performs correction via comparison between the actually computed value and the predicted value.

In the second scheme, if a new GCP object is discovered after the initial start point in the road image, the determined spatial coordinates of feature point are corrected based on the absolute spatial coordinates of the new GCP object. The spatial coordinates of the feature points previously obtained may be simultaneously corrected based on the error between the spatial coordinates determined by the coordinate determining unit 1125 and the absolute spatial coordinates of the newly recognized GCP object.

In the third scheme, if the probe vehicle, after starting driving, passes again the area that it has passed before, a loop route forming a loop from the route that the probe vehicle has passed is determined, and the absolute spatial coordinates of the feature points of the road facility objects present in the loop route may be corrected based on the difference between the absolute spatial coordinates of the feature point of the road facility object determined in the past and the absolute spatial coordinates of the feature point currently determined.

According to an embodiment, the feature point spatial coordinates of the road facility object may be corrected using at least one of the above-described three schemes.

Figure 5:
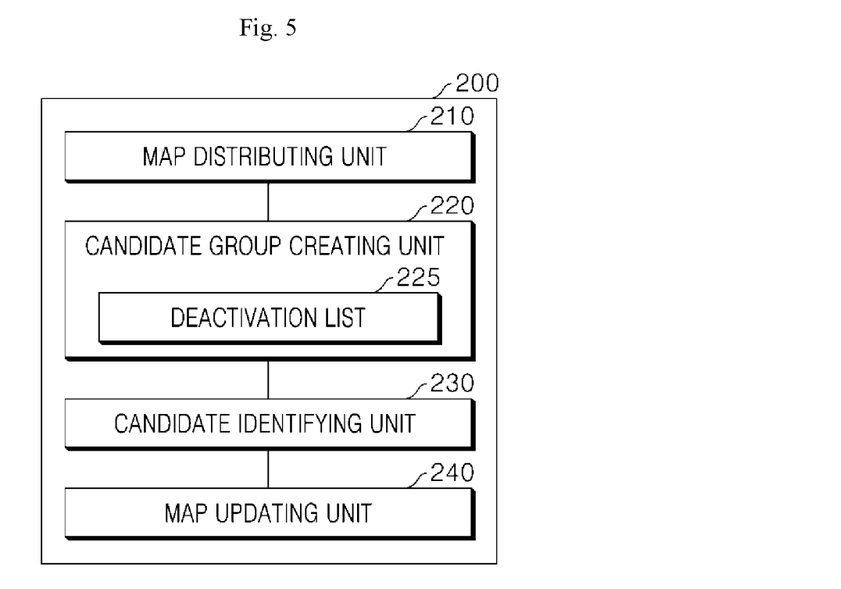
FIG. 5 is a block diagram illustrating a configuration of a map updating server according to an embodiment.

FIG. 5 is a block diagram illustrating a configuration of a map updating server according to an embodiment.

Referring to FIG. 5, a map updating server 200 includes at least one of a map distributing unit 210, a candidate group creating unit 220, a candidate identifying unit 230, and a map updating unit 240.

Whenever a new high-definition map is built up or the existing high-definition map is updated due to a change in the road facility objects, the map distributing unit 210 distributes the high-definition map to the change detecting device 100_1 to 100_*n*.

The candidate group creating unit 220 gathers object change information for a road facility object change from each change detecting device 100_1 to 100_*n* and creates information for a group of candidates that are change objects in the object change information. The created candidate group information is distributed to the change detecting devices 100_1 to 100_*n*.

As described above, each change detecting device 100_1 to 100_*n*, if approaching one of the candidates included in the candidate group information, captures a candidate image for the candidate and transmits the captured candidate image to the map updating server 200.

The candidate identifying unit 230 analyzes the candidate image received from each change detecting device 100_1 to 100_*n* and, only when the candidate included in the candidate image is hidden by an obstacle, identifies whether the candidate is a true change object.

The candidate identifying unit 230 determines the properties of the obstacle in the candidate image via machine learning including deep learning or other various image processing scheme and determines whether the candidate is hidden by the obstacle. If the candidate object in the candidate image is invisible due to various specific obstacles, such as vehicles, motorcycles, or human beings, in the place where the candidate object is supposed to be positioned, the candidate identifying unit 230 determines that there is an obstacle and thus determines that the candidate object has been hidden by the obstacle. Upon determining that the candidate object is hidden by the obstacle, the candidate identifying unit 230 does not change the candidate group information and waits to receive an image for the candidate from another change detecting device.

If an image frame not hidden by an obstacle is detected from the candidate image, the candidate identifying unit 230 performs comparison on the properties, whether there is an object, and the feature point spatial coordinates between the candidate object in the image frame and the object of the high-definition map, thereby determining whether there is a change in the candidate object.

Upon determining that there is a change in the candidate object, the map updating unit 240 updates the existing high-definition map based on the change. The map updating unit 240 updates the high-definition map in such a manner as to update the properties of the object if a property of the object is changed, delete the object from the high-definition map if the object disappears, and create a new object in the high-definition map if a new object appears. Upon determining that there is a change in the candidate object, the candidate identifying unit 230 updates the high-definition map and then deletes the information for the candidate object from the candidate group information.

Upon finally determining that there is no change in the candidate object, the candidate identifying unit 230 deletes the information for the candidate object from the candidate group information.

A specific road facility object may be hidden by an obstacle for a long time due to heavy traffic or road work.

In such a case, the road facility object is determined to be absent all the time and is included in the candidate group information for a long time. Thus, whenever approaching the road facility object, each change detecting device 100_1 to 100_n sends an image captured for the road facility object to the map updating server 200, and the map updating server 200 continues to perform analysis on the image.

To prevent this, if the same candidate is hidden by an obstacle and is thus not recognized from the candidate images gathered from at least two or more change detecting devices, the candidate identifying unit 230 may include the candidate in the deactivation list for a preset time.

Whenever the candidate group information is updated, the map updating server 200 distributes the updated candidate group information to the change detecting device 100_1 to 100_n. The deactivation list is included in the candidate group information. Thus, whenever a change is made to the deactivation list, the updated deactivation list is also distributed to each change detecting device 100_1 to 100_n.

Each change detecting device 100_1 to 100_n refers to the deactivation list included in the candidate group information and delays image transmitting for the candidates included in the deactivation list.

Described below is a method of detecting an object change for updating a high-definition map according to an embodiment. The object change detecting method for updating a high-definition map may be performed by the object change detecting system for updating a high-definition map and a change detecting device described above.

Figure 6:
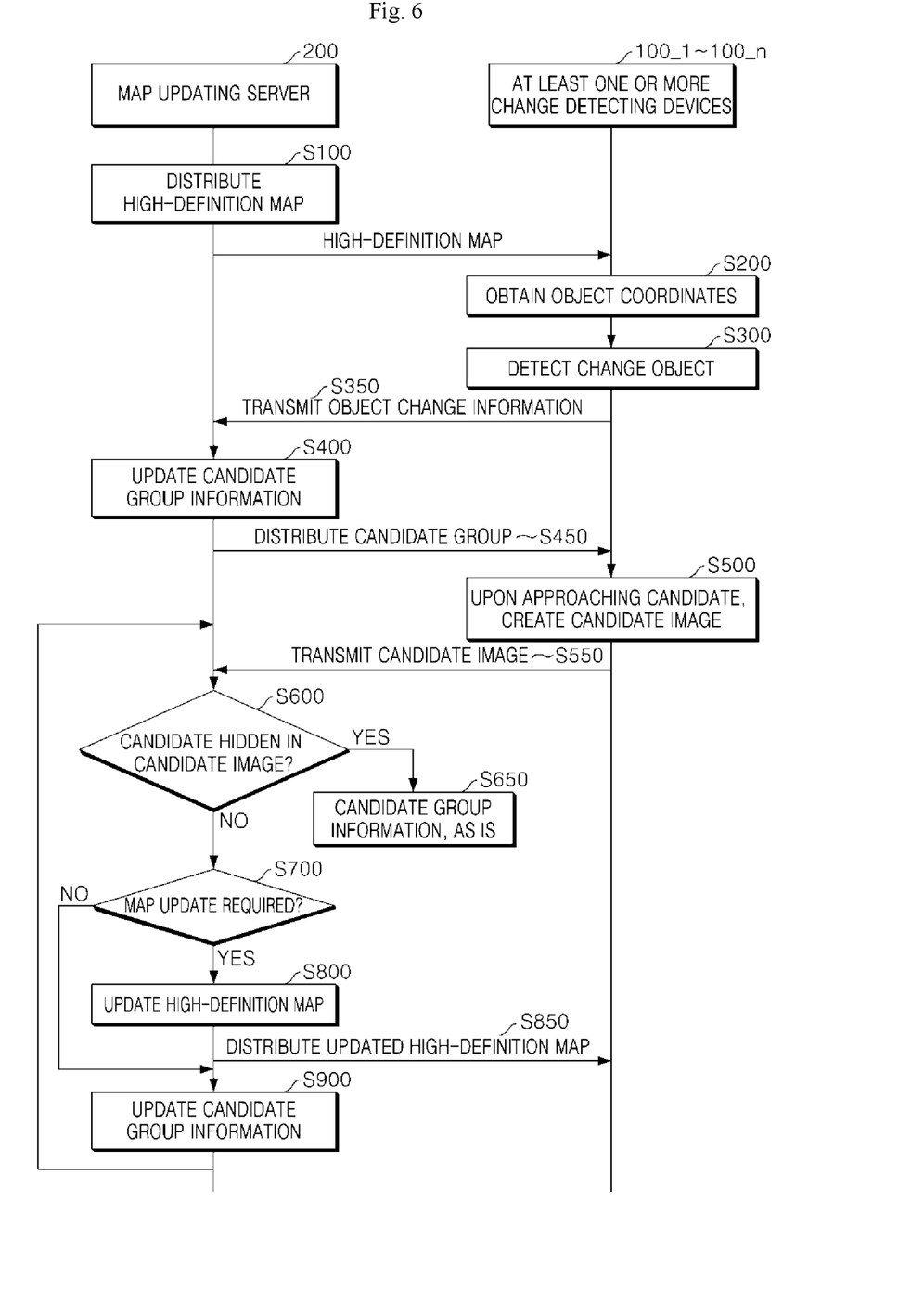
FIG. 6 is a flowchart illustrating an object change detecting method for updating a high-definition map according to an embodiment.

FIG. 6 is a flowchart illustrating an object change detecting method for updating a high-definition map according to an embodiment.

Whenever a new high-definition map is built up or the existing high-definition map is updated due to a change in the road facility objects, the map updating server 200 distributes the high-definition map to each change detecting device 100_1 to 100_n (S100).

The change detecting device 100_1 to 100_n recognizes at least one or more road facility objects from the road image and obtains the properties and feature point spatial coordinates of the recognized objects (S200).

The change detecting device 100_1 to 100_n performs comparison on the properties and feature point spatial coordinates between the recognized object and the object in the high-definition map received from the map updating server 200 and, if a change object is detected, creates object change information including the properties and feature point spatial coordinates of the change object (S300).

The object change information which is information for the change object is transmitted to the map updating server 200 whenever created (S350).

The map updating server 200 updates the candidate group information including the object change information for each change object received from the change detecting device 100_1 to 100_n (S400) and distributes the updated candidate group information to the change detecting devices 100_1 to 100_n.

The change detecting device 100_1 to 100_n, if approaching one of the candidates included in the candidate group information, captures the candidate to thereby create a candidate image (S500) and transmits the candidate image to the map updating server 200 (S550). If the deactivation list is included in the candidate group information, image transmitting for the candidates included in the deactivation list may be delayed for a predetermined time.

The map updating server 200 analyzes the candidate image received from the change detecting device 100_1 to 100_n and determines whether the candidate included in the candidate image has been hidden (S600).

If the candidate object in any frame of the candidate image is invisible due to various specific obstacles, such as vehicles, motorcycles, or human beings, in the place where the candidate object is supposed to be positioned, the map updating server 200 determines that there is an obstacle and thus determines that the candidate object has been hidden by the obstacle. Upon determining that the candidate object is hidden by the obstacle, the map updating server 200 does not change the candidate group information and waits to receive an image for the candidate from another change detecting device (S650).

If an image frame not hidden by an obstacle is detected from the candidate image, the map updating server 200 performs comparison on the properties, whether there is an object, and the feature point spatial coordinates between the candidate object in the image frame and the corresponding object of the high-definition map, thereby determining whether there is a change in the candidate object and, if so, the high-definition map needs to be finally updated (S700).

Upon determining that there is a change in the candidate object so that the high-definition map needs to be finally updated, the map updating server 200 updates the existing high-definition map based on the change (S800). The map updating server 200 updates the properties of the object if a property of the object is changed, delete the object from the high-definition map if the object disappears, and create a new object in the high-definition map if a new object appears.

Then, the map updating server 200 distributes the updated high-definition map to all the change detecting devices 100_1 to 100_n (S850).

If the high-definition map is updated and distributed, the map updating server 200 updates the high-definition map by deleting information for the candidate object from the candidate group information (S900). The updated candidate group information is distributed to all the change detecting devices 100_1 to 100_n (S450).

Upon determining that there is no change in the candidate object so that the high-definition map need not be finally updated, the map updating server 200 deletes the information for the candidate object from the candidate group information (S900). The updated candidate group information is distributed to all the change detecting devices 100_1 to 100_n (S450).

Figure 7:
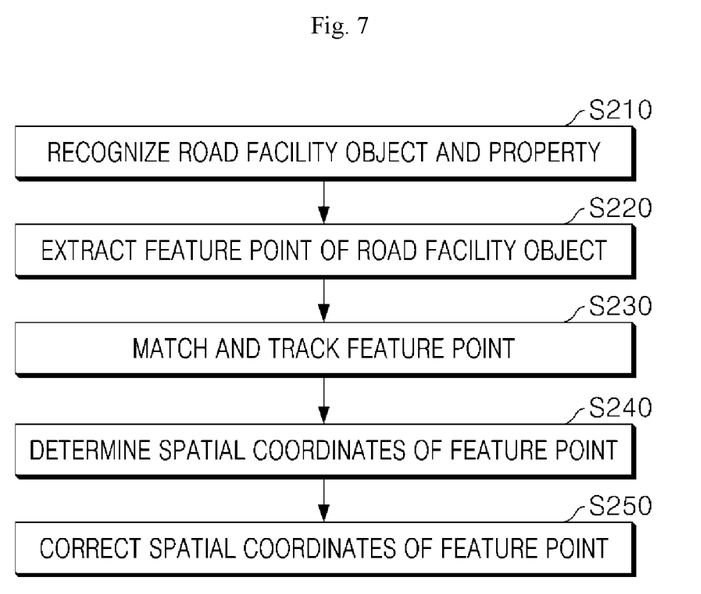
FIG. 7 is a flowchart illustrating a process of obtaining object coordinates in FIG. 6.

FIG. 7 is a flowchart illustrating a process of obtaining object coordinates in FIG. 6.

The change detecting device 100 recognizes, per frame of the road image, the properties and road facility objects including at least one of GCP objects and ordinary objects from each frame of the road image (S210). Machine learning including deep learning or other various image processing schemes may be used to recognize the road facility objects.

Then, the change detecting device 100 extracts the feature points of at least one or more road facility objects from the road image (S220).

Then, the change detecting device 100 matches and tracks the feature points of all the road facility objects extracted from each frame of the road image on each consecutive frame (S230).

After matching the feature points, the change detecting device 100 obtains relative spatial coordinates of the feature point to minimize a difference between camera pose information predicted from the tracked feature point and calculated camera pose information (S240).

Then, the change detecting device 100, upon recognizing a GCP object, obtains the absolute spatial coordinates of the feature point by correcting the relative spatial coordinates of the feature point with respect to the coordinate point of the GCP object whose absolute spatial coordinates has been known (S250).

The so-obtained properties and feature point spatial coordinates of the road facility objects are used for comparison with corresponding objects of the high-definition map.

It should be appreciated that various embodiments of the disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

Various embodiments as set forth herein may be implemented as software (e.g., the program 1440) including one or more instructions that are stored in a storage medium (e.g., internal memory 1436 or external memory 1438) that is readable by a machine (e.g., the electronic device 1401). For example, a controller (e.g., the controller 1420) of the machine (e.g., the electronic device 1401) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program products may be traded as commodities between sellers and buyers. The computer program product may be distributed in the form of a machine-readable storage medium (e.g., compact disc read only memory (CD-ROM)), or be distributed (e.g., downloaded or uploaded) online via an application store (e.g., Play Store™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

What is claimed is:

1. A system for detecting a change in object for updating a high-definition map, the system including at least one or more change detecting devices comparing the high-definition map and a road facility object of a road image captured by a camera fixed to a vehicle, each of the change detecting devices comprising:

a map information storage unit receiving a high-definition map including a property of each road facility object and spatial coordinates of a feature point from a map updating server and storing the received high-definition map;

an object coordinates obtaining unit recognizing at least one road facility object from the road image and obtaining a property of the recognized object and spatial coordinates of a feature point; and a changed object detecting unit comparing the property of the recognized object and the spatial coordinates of the feature point with the high-definition map and, if a change object is detected, transmitting object change information including a property and feature point spatial coordinates of the change object and an image of the change object to the map updating server, wherein the change object is any one of an object property change, generation of a new object, and deletion of an existing object, wherein the object coordinates obtaining unit comprises a key frame determining unit;

wherein the key frame determining unit analyzes the feature points of each frame in the road image and determines that the frame when the relative spatial coordinates of the feature point has moved a reference range or more between the frames is the key frame; and determines that the frame after the vehicle has moved a predetermined distance is the key frame and tracks the feature points using only the key frame.

2. The system of claim 1, wherein the object coordinates obtaining unit includes:
an object recognizing unit recognizing, per frame of the road image, a road facility object including at least one of a ground control point (GCP) object and an ordinary object and a property;
a feature point extracting unit extracting a feature point of at least one or more road facility objects from the road image;
a feature point tracking unit matching and tracking the feature point in consecutive frames of the road image;
a coordinate determining unit obtaining relative spatial coordinates of the feature point to minimize a difference between camera pose information predicted from the tracked feature point and calculated camera pose information; and
a correcting unit obtaining absolute spatial coordinates of the feature point by correcting the relative spatial coordinates of the feature point based on a coordinate point of the GCP object whose absolute spatial coordinates are known when the GCP object is recognized.

3. The system of claim 1, wherein the map updating server includes a candidate group creating unit gathering the object change information from the at least one or more change detecting devices, generating information for a group of candidates that are change objects of the object change information, and distributing the candidate group information to the change detecting devices, and wherein upon approaching one of one of the candidates included in the candidate group information, the change detecting device captures a candidate image for the candidate and transmits the captured candidate image to the map updating server.

4. The system of claim 1, wherein the map updating server includes a candidate identifying unit identifying whether the candidate of the candidate image is a true change object only when not hidden by an obstacle and, if the candidate is identified to be the true change object, updating the high-definition map on the true change object, and wherein the updated high-definition map is distributed to the at least one or more change detecting devices.

5. The system of claim 4, wherein the candidate group information includes an deactivation list that delays transmitting a specific candidate image, and wherein if the same candidate is hidden by an obstacle not to be recognized from a candidate image gathered for the same candidate from at least two or more change detecting devices, the map updating server includes the same candidate in the deactivation list for a preset time.

6. The system of claim 1, wherein the change detecting device compares the property and feature point spatial coordinates of the object recognized per frame of the road image with an object of the high-definition map and, upon determining that the objects match each other in at least one or more frames, determine that there is no object change.

7. A method of detecting a change in an object for updating a high-definition map, the method performed by at least one or more change detecting devices, the method comprising:
receiving a high-definition map including a property of each road facility object and spatial coordinates of a feature point from a map updating server and storing the received high-definition map;
recognizing at least one road facility object from a road image including an image of a road facility object captured by a camera fixed to a vehicle and obtaining a property and feature point spatial coordinates of the recognized object; and
comparing the property of the recognized object and the spatial coordinates of the feature point with the high-definition map and, if a change object is detected, transmitting object change information including a property and feature point spatial coordinates of the change object and an image of the change object to the map updating server, wherein the change object is any one of an object property change, generation of a new object, and deletion of an existing object,
wherein the method analyzes the feature points of each frame in the road image and determines that the frame when the relative spatial coordinates of the feature point has moved a reference range or more between the frames is the key frame; and
determines that the frame after the vehicle has moved a predetermined distance is the key frame and tracks the feature points using only the key frame.

8. The method of claim 7, further comprising:
recognizing, per frame of the road image, a road facility object including at least one of a ground control point (GCP) object and an ordinary object and a property;
extracting a feature point of at least one or more road facility objects from the road image;
matching and tracking the feature point in consecutive frames of the road image;
obtaining relative spatial coordinates of the feature point to minimize a difference between camera pose information predicted from the tracked feature point and calculated camera pose information; and
obtaining absolute spatial coordinates of the feature point by correcting the relative spatial coordinates of the feature point based on a coordinate point of the GCP object whose absolute spatial coordinates are known when the GCP object is recognized.

9. The method of claim 7, further comprising:
gathering, by the map updating server, the object change information from the at least one or more change detecting devices, generating information for a group of candidates that are change objects of the object change information, and distributing the candidate group information to the change detecting devices; and
upon approaching one of one of the candidates included in the candidate group information, capturing, by the change detecting device, a candidate image for the candidate and transmitting the captured candidate image to the map updating server.

10. The method of claim 9, further comprising:
identifying, by the map updating server, whether the candidate of the candidate image is a true change object only when not hidden by an obstacle; and
if the candidate is identified to be the true change object, updating, by the map updating server, the high-definition map on the true change object, and wherein the updated high-definition map is distributed to the at least one or more change detecting devices.

11. The method of claim 9, wherein the candidate group information includes an deactivation list that delays transmitting a specific candidate image, and wherein if the same candidate is hidden by an obstacle not to be recognized from a candidate image gathered for the same candidate from at least two or more change detecting devices, the map updating server includes the same candidate in the deactivation list for a preset time.

12. The method of claim 7, further comprising comparing the property and feature point spatial coordinates of the object recognized per frame of the road image with an object of the high-definition map and, upon determining that the objects match each other in at least one or more frames, determining that there is no object change.

* * * * *